United States Patent Office 2,772,947
Patented Dec. 4, 1956

2,772,947

PROCESS FOR CONVERTING NICKEL SULFIDE TO NICKEL SULFATE

Elbert O. Sowerwine, Jr., Wapiti, Wyo., assignor to Wigton-Abbott Corporation, Plainfield, N. J., a corporation of New Jersey No Drawing. Application March 23, 1951,
Serial No. 217,310

2 Claims. (Cl. 23—117)

This invention relates to the treatment of spent catalysts of the type frequently employed in the hydrofining of sulfur containing petroleum liquids. More particularly, the invention relates to a new and improved procedure for treating spent nickel catalyst comprising predominantly nickel sulfide to directly oxidize the same to nickel sulfate.

Hydrofining of sulfur containing petroleum liquids involves treating a petroleum liquid, as such, or in the vapor state, with hydrogen in the presence of a catalyst such as nickel oxide, generally at elevated temperature and superatmospheric pressure, to effect hydrogenation and/or desulfurization of the petroleum liquid. Whether the hydrofining process is primarily for hydrogenation (in which event the catalyst may be used for a considerable period of time before it is "poisoned" or inactivated by sulfur), or is primarily for desulfurization (in which event the activity of the catalyst is rapidly destroyed), the change which takes place in the catalyst is essentially the same and involves conversion of a substantial portion of the nickel oxide to nickel sulfide. As large quantities of catalyst are required in commercial use of these hydrofining processes, it is essential to recover the spent catalyst and regenerate it, i. e., chemically treat it to obtain catalytically active nickel oxide.

Regeneration procedures heretofore available have been generally unsatisfactory in either failing to provide catalytically active nickel oxide or in requiring an involved multi-step procedure in order to obtain a satisfactory yield of regenerated catalyst having the desired properties. Roasting of the nickel sulfide in the presence of oxygen to convert the same to nickel oxide is impractical because the conversion to nickel oxide is generally incomplete and further because the sintered product thus obtained has a low order of catalytic activity. In order to reactivate such a catalyst, it is necessary to employ a supplemental treatment, such as reacting with nitric acid vapor and again heating to convert the catalyst to the active oxide form.

Another regeneration procedure involves oxidizing the nickel sulfide in a gas mixture obtained by burning natural gas or fuel oil with an excess of air to form nickel sulfate, dissolving the latter in water and reacting with an alkali metal carbonate to precipitate nickel carbonate, and after drying the carbonate, heating it to about 300–350° C. to form active nickel oxide. In this procedure, however, the recovery of active catalyst is low, due to incomplete reaction in the oxidation step. In this step, a considerable amount of nickel sulfide remains unchanged, while some is converted to nickel oxide. These are lost to the regeneration process, although the nickel can, of course, be separately recovered.

I have now discovered an improved procedure for treating spent catalyst comprising predominantly nickel sulfide to effect a substantially quantitative conversion of the nickel sulfide to nickel sulfate. This procedure is advantageous, not only as a means for recovering nickel from spent catalyst in the form of the sulfate salt, but also, and even more important, as a means for improving the catalyst regeneration procedure last mentioned above.

Regarded in certain of its broader aspects, my invention comprises heating spent nickel catalyst, primarily in the form of nickel sulfide, in an atmosphere of sulfur dioxide containing a limited amount of oxygen, and so controlling the oxygen and sulfur dioxide concentration, temperature, and pressure that the nickel sulfide is converted almost quantitatively to nickel sulfate and/or nickel sulfite.

In the reaction of nickel sulfide with oxygen in a sulfur dioxide atmosphere, a number of competing reactions may take place, including those which may be represented as follows:

NiS+2O$_2$⇌NiSO$_4$
2NiS+3O$_2$⇌2NiO+2SO$_2$
NiO+SO$_2$⇌NiSO$_3$

These reactions with oxygen are exothermic reactions which are hindered or retarded to a certain extent at elevated temperatures. They are favored or aided by increased pressure and increased oxygen concentration. I have discovered, however, that by providing an atmosphere having a high sulfur dioxide content, the reaction to form nickel oxide can be retarded, and that the retarding effect of elevated temperature is much more pronounced with the sulfate reaction than with the oxide reaction.

I have found that by proper regulation of the oxygen concentration in a high sulfur dioxide atmosphere, and by proper control of the temperature and pressure conditions, it is possible to convert substantially all of the nickel sulfide to nickel sulfate. The ability to selectively obtain nickel sulfate appears to be due, at least in part, to the elimination of local overheating by maintaining the exothermic reaction continually in check and effecting a gradual or gentle oxidation of the nickel sulfide.

The manner of controlling the reaction will be better understood from a consideration of the following effective and preferred reaction conditions:

|  | Effective | Preferred |
| --- | --- | --- |
| Temperature | 0–400° C | 140–300° C. |
| Pressure | 1–100 atmos. | 10 atmos. or more. |
| Oxygen conc. | trace to 40% | 3–10%. |
| SO$_2$ conc. | 50% or more | 80% or more. |

The oxygen can be supplied as such or in mixture with an inert gas such as nitrogen. Air, for example, is a suitable source of oxygen, and can be effectively employed, particularly when operating at the lower oxygen concentrations.

When employing effective conditions outside the preferred range, a variation in one condition requires appropriate variation of their conditions. Thus for example, at pressures below about 10 atmospheres, a moderate temperature, i. e., about 140° C. can be employed in conjunction with an atmosphere which is very high in oxygen and moderate in sulfur dioxide content. At temperature above about 300° C. it is preferable to operate under increased pressure in an atmosphere containing relatively less oxygen and more sulfur dioxide. By way of illustration, an atmosphere of over 95% sulfur dioxide and only a trace of oxygen, with the remainder being an inert gas, such as nitrogen, would be appropriate when operating at a temperature close to 400° C. An oxygen concentration in excess of about 10%, can, on the other hand, be used at temperatures below about 140° C. The lower the temperature used, the higher the pressure must be to attain a reasonable rate of reaction. At temperatures from about 140° to about 200°, where there is appreciable tendency to form NiO, higher pressures and sulfur dioxide concentrations are needed to compensate for moderately high oxygen concentrations. Thus, with an atmosphere of about 12% oxygen and 88% sulfur dioxide, a temperature of about 150° C. and a pressure approaching 100 atmospheres should be employed.

The oxidation can be carried out in any suitable reaction vessel or chamber designed to withstand the elevated pressures required; and it is preferable to provide means for moderate agitation of the spent catalyst to maintain uniformity of reaction throughout the mass.

In the event that some of the nickel sulfide remains unchanged, or part of it is converted to nickel oxide, the nickel sulfate can readily be separated from the reaction mixture by dissolving in water. As some of the sulfate may be present as basic nickel sulfate which is insoluble in water, a small amount of mineral acid may be added to the water to effect its solution and removal. The undissolved sulfide and/or oxide can then be separately treated to recover the nickel therein, or it can be combined with additional spent catalyst in a later oxidation procedure. With proper control of the reaction conditions, as above described, however, it is possible to effect an almost quantitative conversion of nickel sulfide to nickel sulfate.

It should also be noted that there is a tendency when oxidizing nickel sulfide in the presence of sulfur dioxide, particularly as the sulfur dioxide concentration is increased, to form some nickel sulfite along with the nickel sulfate. The presence of nickel sulfite in the oxidation reaction mixture is in no way objectionable since this nickel sulfite can be readily converted to nickel sulfate at ordinary atmospheric temperature by merely exposing to air, as for example, by bubbling air through the water solution prepared from the oxidation reaction mixture. Thus, nickel sulfide which in the oxidation step is converted to either nickel sulfate or nickel sulfite is recovered as, and hence converted to, nickel sulfate.

Various changes and modifications in the foregoing procedures will occur to those skilled in the art, and to the extent that such changes and modifications are embraced by the appended claims, they constitute part of my invention.

I claim:

1. The process that comprises heating spent nickel catalyst, primarily in the form of nickel sulfide, in an atmosphere of at least 80 to 90% sulfur dioxide and about 3 to 10% oxygen, and controlling the temperature within the range of about 140 to 300° C. and the pressure above about 10 atmospheres to thereby convert said nickel sulfide to nickel sulfate.

2. The process for converting nickel sulfide to nickel sulfate that comprises heating nickel sulfide at a moderately elevated temperature not in excess of about 400° C. in an atmosphere containing in excess of 80% sulfur dioxide and about 3 to 10% of oxygen, while maintaining a superatmospheric pressure.

References Cited in the file of this patent
UNITED STATES PATENTS

| | | |
|---|---|---|
| 791,090 | Frasch | May 30, 1905 |
| 1,266,731 | Westby | May 21, 1918 |
| 1,364,573 | Moore | Jan. 4, 1921 |
| 1,590,525 | Kichline | June 29, 1926 |
| 1,678,627 | Jaeger | July 24, 1928 |
| 1,729,423 | Harshaw | Sept. 24, 1929 |
| 1,922,490 | Miller | Aug. 15, 1933 |
| 1,949,928 | Corson | Mar. 6, 1934 |
| 2,394,739 | Archibald | Feb. 12, 1946 |
| 2,587,149 | Gwynn | Feb. 26, 1952 |